US008270585B2

(12) United States Patent
Kumar et al.

(10) Patent No.: US 8,270,585 B2
(45) Date of Patent: Sep. 18, 2012

(54) SYSTEM AND METHOD FOR AN ENDPOINT PARTICIPATING IN AND MANAGING MULTIPOINT AUDIO CONFERENCING IN A PACKET NETWORK

(75) Inventors: Krishna Anoop Kumar, Singapore (SG); Teck Hong Teo, Singapore (SG); Tze Shyan Wong, Singapore (SG); Tanu Malhotra, Singapore (SG)

(73) Assignee: STMicroelectronics, Inc., Carrollton, TX (US)

( * ) Notice: Subject to any disclaimer, the term of this patent is extended or adjusted under 35 U.S.C. 154(b) by 2811 days.

(21) Appl. No.: 10/701,350

(22) Filed: Nov. 4, 2003

(65) Prior Publication Data

US 2005/0094580 A1    May 5, 2005

(51) Int. Cl.
*H04M 3/42* (2006.01)
(52) U.S. Cl. ............... 379/202.01; 379/93.21; 379/158; 370/265

(58) Field of Classification Search ............... 379/93.21, 379/158, 202.01–206.01, 406.01–406.05; 370/286–289, 260–269; 726/2
See application file for complete search history.

(56) References Cited

U.S. PATENT DOCUMENTS

| | | | | |
|---|---|---|---|---|
| 5,644,711 | A * | 7/1997 | Murphy | 726/2 |
| 6,304,648 | B1 * | 10/2001 | Chang | 379/202.01 |
| 2004/0240664 | A1 * | 12/2004 | Freed | 379/406.01 |
| 2005/0007965 | A1 * | 1/2005 | Hagen et al. | 370/260 |
| 2005/0058277 | A1 * | 3/2005 | Barron et al. | 379/406.01 |

* cited by examiner

Primary Examiner — Md S Elahee

(57) ABSTRACT

A system and method is disclosed for implementing a multipoint control unit in an endpoint that is participating in and managing a multipoint audio conference in a packet network. The multipoint control unit establishes audio communications between a plurality of endpoints of the packet network, mixes audio communications from the plurality of endpoints, and provides echo cancellation for the endpoint that is managing the multipoint audio conference.

21 Claims, 10 Drawing Sheets

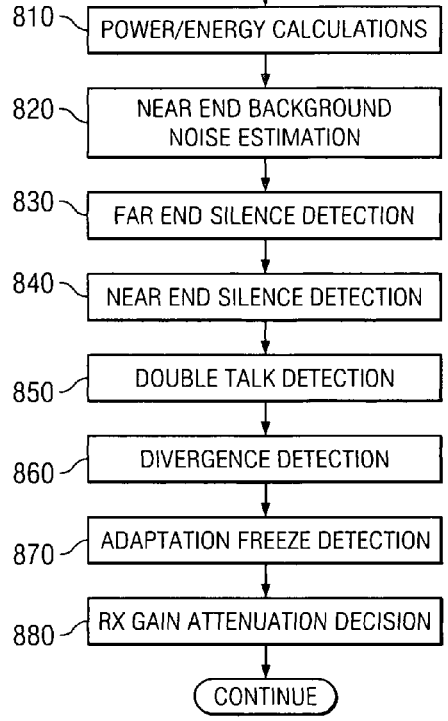
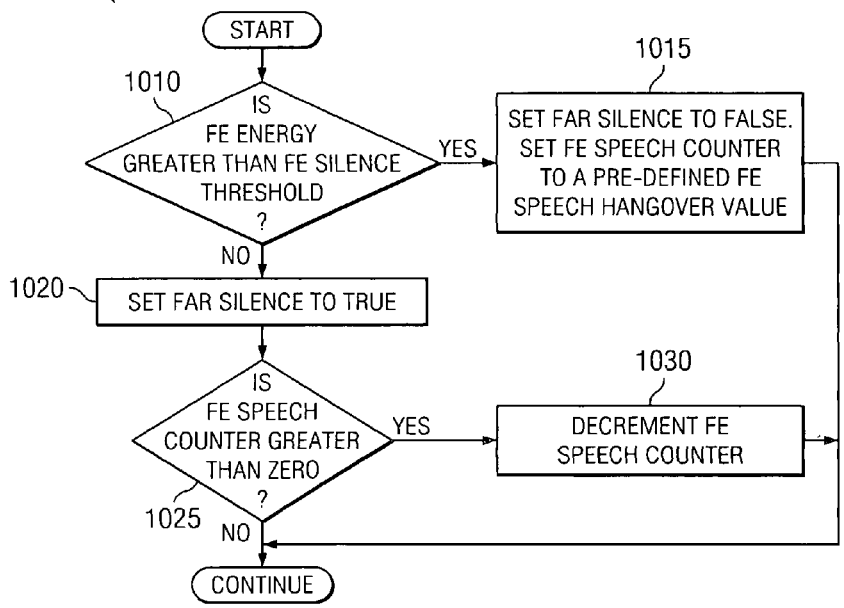

SYSTEM AND METHOD FOR AN ENDPOINT PARTICIPATING IN AND MANAGING MULTIPOINT AUDIO CONFERENCING IN A PACKET NETWORK

TECHNICAL FIELD OF THE INVENTION

The present invention is generally directed to packet based communication networks and, more specifically, to a system and method for implementing a multipoint control unit (MCU) in an endpoint that is participating in and managing a multipoint audio conference in a packet based communication network.

BACKGROUND OF THE INVENTION

In multipoint conferencing, three or more endpoint terminals communicate with each other across a network. In a packet network, there are two methods for multipoint conferencing. These are the "centralized" mode and the "de-centralized" mode, as mentioned in the H.323 standard of the International Telecommunications Union (ITU). A centralized resource, often referred to as a Multipoint Control Unit (MCU), provides the control and processing functions to each of the endpoint terminals in the conference. The Multipoint Control Unit (MCU) is an H.323 endpoint that provides the services necessary for three or more endpoints to participate in a multipoint conference known as a "conference call." A Multipoint Control Unit (MCU) comprises a Multipoint Controller (MC), which is required, and may (or may not) comprise one or more Multipoint Processors (MP). The Multipoint Controller (MC) provides the call control functionality required for a multipoint conference, including the negotiation of common endpoint capabilities. The Multipoint Processor (MP), if one is present, provides processing (mixing or switching) of the media streams (i.e., audio, video and/or data streams).

In the centralized mode, the MCU unicasts the processed information streams to each endpoint. The unicast nature of the centralized mode uses more bandwidth as the number of participants in the conference increases. Moreover, in prior art systems the unicast streams that are sent from the MCU are likely to contain the same audio or video information.

In the de-centralized mode, the endpoint terminals multicast their information streams to all other endpoint terminals, rather than through an MCU. Each endpoint terminal is then responsible for selecting among the incoming streams and performing its own processing functions. If an MCU is included in a de-centralized system, the MCU handles only the MC function and is used as a bridge between the multicast environment and a separate unicast environment, and the MP function is left to the endpoints.

Though the H.323 standard mentions that the MC and MP functionality may also be incorporated into other H.323 entities (i.e., terminals, gateways, or gatekeepers), the H.323 does not mention how to implement this. Also, the method that is used to bridge the multicast/unicast environment is proprietary to different implementations.

An apparatus and method described in U.S. Pat. No. 6,404,745 tries to solve the bandwidth efficiency problems associated with a centralized mode multipoint conferencing arrangement. This approach involves transmitting multimedia streams from endpoint terminals to an MCU using unicast transmission. The multimedia streams are processed in the MCU and transmitted back to the endpoint terminals using multicast transmission. But as mentioned in U.S. Pat. No. 6,404,745, this method also requires the central resource to unicast other multimedia streams to selected endpoints. In the selected endpoint terminals, processing of the multimedia stream is inhibited in favor of the unicast streams, or an additional control command from the central resource to the selected endpoint terminals is required to inhibit processing of the multicast streams. This method reduces the required bandwidth a little but imposes the condition that the endpoints participating must implement the additional control processing in order to participate.

A de-centralized, receiver-based audio packet management system that intelligently selects which packets to mix is described in U.S. Pat. No. 6,418,125. In such a system, each endpoint transmits packets (multicasts or unicasts) which are received by all other endpoints participating in the conference. Each receiver uses a speaker management scheme that also identifies the speakers who are associated with the audio packets and identifies which speakers are currently "active." Of the speakers who are identified as "active," each speaker independently decides which speakers to mix together to produce an output audio stream. In addition, each receiver has to perform "adaptive jitter buffer processing" of all other participants. Though the bandwidth requirement may be significantly reduced in this method, the processing overhead in each of the endpoints has increased tremendously. Also, as in the previous case, this implementation also requires all the endpoints that are participating to have the capability of speaker management and mixing.

Consider, for example, the prior art network topology 100 illustrated in FIG. 1. Prior art network topology 100 comprises a multipoint control unit (MCU) 150 and a plurality of endpoints that are separate units. Prior art network topology 100 may include several local area networks connected to a wide area network or Internet through routers. In the network topology 100 shown in FIG. 1, network 120, network 130, and network 140 are coupled to and communicate through network 110 (e.g., Internet 110). Network 120 comprises endpoints (EP) 122, 124, 126 and router 128. Network 130 comprises endpoints (EP) 132, 134, 136 and router 138. Network 140 comprises endpoints (EP) 142, 144, 146, router 148, and multipoint control unit (MCP) 150.

The networks 120, 130 and 140 each comprise a plurality of endpoint terminals (EP) that are capable of sourcing and receiving information streams. This may be done, for example, by establishing logical channels in accordance with the ITU-T H.245 standard and the H.323 standard.

In addition to the endpoint terminals in local network 140, a multipoint control unit (MCU) 150 is connected in local network 140. MCU 150 provides the capability for two or more endpoint terminals to communicate in a multipoint conference. MCU 150 provides conference control and centralized processing of audio, video and data streams, which include mixing and/or switching of the streams.

In a typical prior art system, the endpoints receive a mix of audio sources selected from among the conference endpoints based upon a comparison of voice levels of the conference endpoints, which are designated audio broadcasters. The broadcast audio is then transmitted by the multipoint control unit (MCU) on a single multicast address to all of the endpoints in the conference. But the problem is that this cannot be the audio that is to be received by the endpoints that are identified as the broadcasters. If this is the case, the endpoint will hear a delayed version of its own speaker's voice resulting in an echo-like situation. This problem is avoided in U.S. Pat. No. 6,404,745 by sending separate and distinct audio streams to those endpoints, for which the broadcast mix is not appropriate, using a unicast audio stream. But then in these endpoints there must exist a decision making mechanism to choose either the multicast stream or the unicast one. Some methods to do this are also presented in U.S. Pat. No. 6,404,745. The problem with this approach is that the delay in arrival of the unicast stream could have an adverse affect on the decision making mechanism.

There is therefore a need in the art for an improved system and method for providing a multipoint control unit (MCU) for use in a multipoint audio conference in a packet network. There is also a need in the art for an improved system and method for implementing a multipoint control unit (MCU) in an endpoint that is participating in and managing a multipoint audio conference in a packet network.

SUMMARY OF THE INVENTION

To address the deficiencies of the prior art, it is a primary object of the present invention to provide an improved system and method for implementing a multipoint control unit (MCU) in an endpoint that is participating in and managing a multipoint audio conference in a packet network.

The present invention provides a solution to the problems associated with an endpoint that participates in and hosts an audio conference in a packet network. The present invention does not depend on the existence or availability of a separate multipoint control unit (MCU) in the network. The present invention does not impose any additional requirements in the participating endpoints, other than being compliant with the existing communication standards. Existing communication standards include the H.323 standard for an endpoint, the SMDS (Switched Multimegabit Data Service) Interface Protocol (SIP) for a User Agent (UA) and the Master Gateway Control Protocol (MGCP) for a Master Gateway (MG). The endpoint that is participating in and managing the multipoint audio conference may be any endpoint in the packet network.

The present invention reduces the decision making and processing overhead at all the other participating endpoints. Because the endpoint that is hosting the conference is also participating in the conference, the problem of echo (line/acoustic) will be present. The problem of echo cancellation is also addressed together with the conferencing system.

The system and method of the present invention provides all the features of an endpoint and, in addition, provides the endpoint with the capability to host a multipoint audio conference.

If an endpoint hosts an audio conference without the assistance of an external MCU, the main functions are to establish the connections with the various endpoints participating in the conference, audio mixing and echo cancellation. The system and method of the invention is proposed for an endpoint that participates in and manages a multipoint audio conference in a packet network. The endpoint could be an IPPhone, for example. Specifically, the method described establishing the connection within the framework of H.323/SIP/MGCP like call signaling protocol and performing the necessary audio mixing in combination with an echo canceller.

An echo canceller (line/acoustic) of the present invention is provided. The echo canceller has additional degrees of freedom that are useful in tuning the echo canceller for it to perform in different environments. The system and method of the present invention is described using a three party conference as an example, but the present invention is not limited to a three party conference. The principles of the present invention are applicable to more than three parties and are limited only by the system resources and computational capabilities. Although the exemplary system and method of the invention is described for audio conferencing, it could be used along with video with the endpoint selecting the video according to a management function that identifies the speaker.

It is an object of the present invention to provide an improved system and method for implementing a multipoint control unit (MCU) in an endpoint that is participating in and managing a multipoint audio conference in a packet network.

It is also an object of the present invention to provide a multipoint control unit (MCP) that is capable of establishing audio communication connections between endpoints in a packet network.

It is another object of the present invention to provide a multipoint control unit (MCP) that is capable of mixing audio communications from a plurality of endpoints in a packet network.

It is yet another object of the present invention to provide a multipoint control unit (MCP) that is capable of providing echo cancellation for audio communications from an endpoint that participates in and manages a multipoint audio conference in a packet network.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the Detailed Description of the Invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 8 illustrates a flow chart showing exemplary steps in the operation of a controller block in accordance with the principles of the present invention;

FIG. 10 illustrates a flow chart showing exemplary steps for the operation of a far end silence detection process in accordance with the principles of the present invention;

DETAILED DESCRIPTION OF THE INVENTION

FIGS. 2 through 15, discussed below, and the various embodiments used to describe the principles of the present invention in this patent document are by way of illustration only and should not be construed in any way to limit the scope of the invention. Those skilled in the art will understand that the principles of the present invention may be implemented for any suitably arranged packet based communication system.

Figure 2:
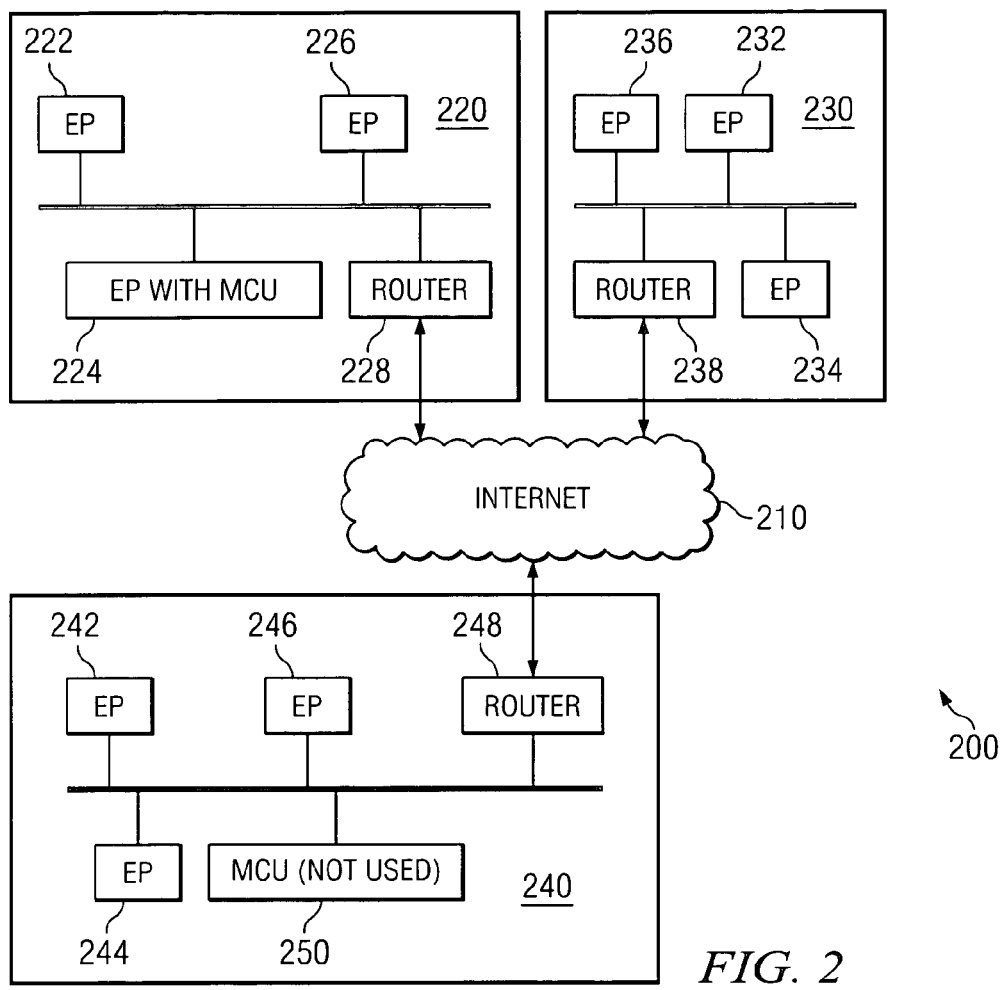
FIG. 2 illustrates a network topology in which one endpoint comprises a multipoint control unit (MCU) in accordance with the principles of the present invention.

The problems identified in the prior art are solved by the present invention. FIG. 2 illustrates an exemplary network topology 200 of the present invention in which a multipoint control unit (MCU) is located within an endpoint 224. Network topology 200 may include several local area networks connected to a wide area network or Internet through routers.

In the network topology 200 shown in FIG. 2, network 220, network 230, and network 240 are coupled to and communicate through network 210 (e.g., Internet 210). Network 220 comprises endpoints (EP) 222, 224, 226 and router 228. Network 230 comprises endpoints (EP) 232, 234, 236 and router 238. Network 240 comprises endpoints (EP) 242, 244, 246, router 248, and multipoint control unit (MCP) 250. In the present invention, the separate multipoint control unit (MCP) 250 is not used.

The networks 220, 230 and 240 each comprise a plurality of endpoint terminals (EP) that are capable of sourcing and receiving information streams. This may be done, for example, by establishing logical channels in accordance with the ITU-T H.245 standard and the H.323 standard.

The system and method of the present invention does not need the presence of a MCU as a separate entity in the network (e.g., MCU 250). Rather, the MCU of the present invention exists as part of an endpoint (e.g., EP 224 with MCU) that hosts a multipoint audio conference. Further, the system and method of the invention does not need any special implementation in the participating endpoints other than the normal call establishment as described in the H.323 standard between two endpoints (or as described in the SIP standard between two User Agents (UA)).

For the purposes of illustration a three (3) point conference in a H.323 based system will be described. The call set up will be carried out using H.323 signaling. It is understood, however, that the same principles could also be used when the call control protocol is an SIP protocol or the like. Also, the principles of the present invention could be extended to any number of participants. The use of the present invention is limited only by the computing resources that are available.

Figure 1:
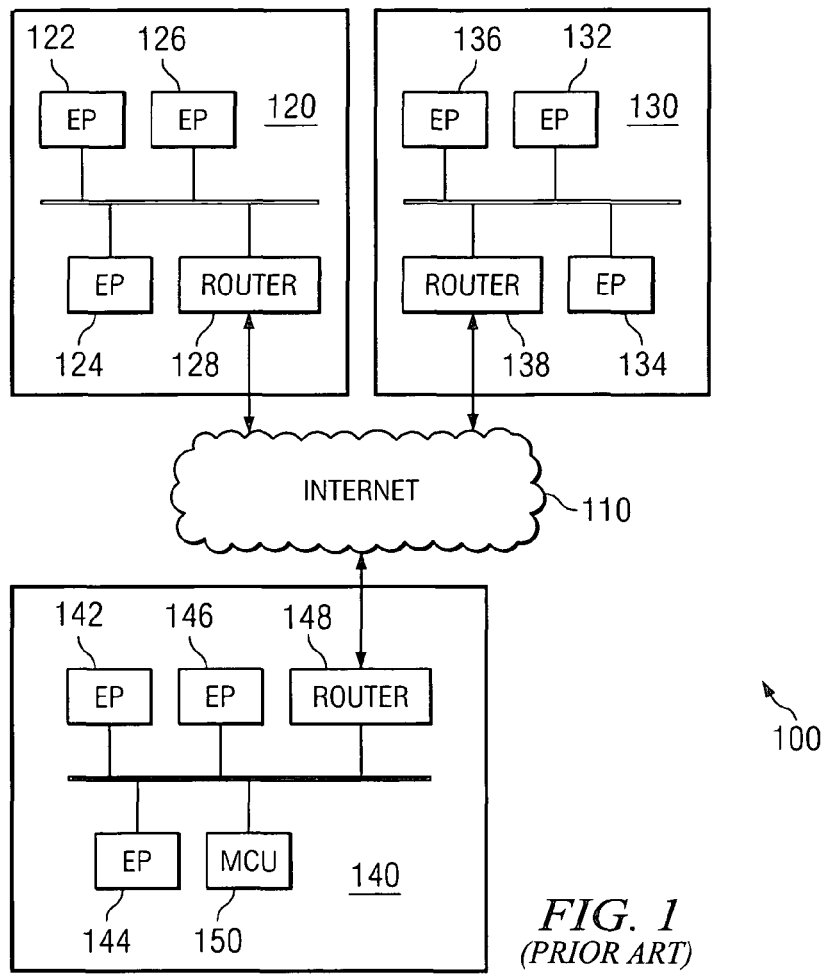
FIG. 1 illustrates a prior art network topology in which a multipoint control unit (MCU) and a plurality of endpoints are separate units.
Figure 3:
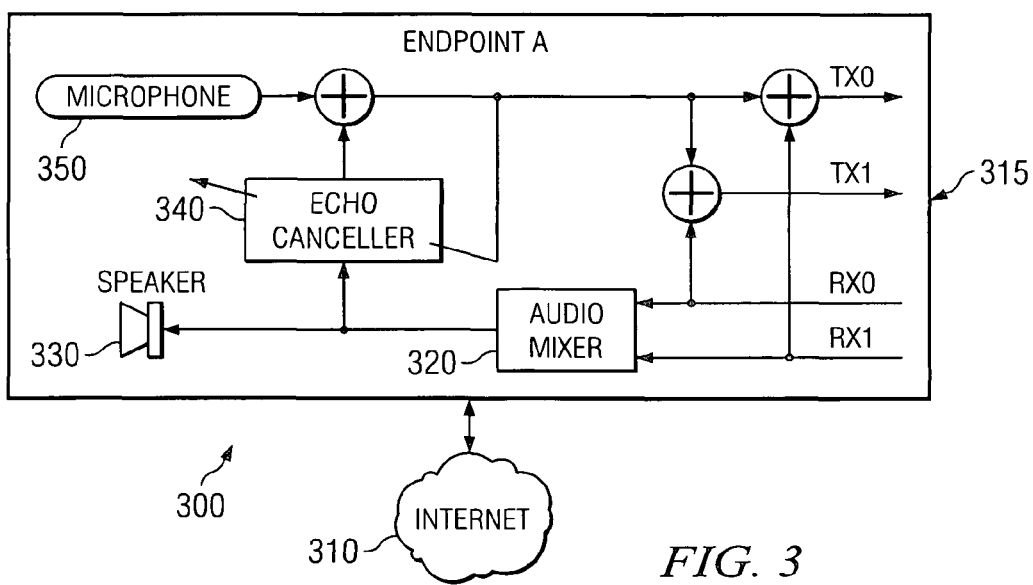
FIG. 3 illustrates an exemplary system of the present invention for an endpoint that participates in and manages a multipoint audio conference.

An exemplary embodiment of the system of the present invention (in an Endpoint A) is shown in FIG. 3. Endpoint A is designated with reference numeral 315. Endpoint A is hosting and participating in the multipoint audio conference. Endpoint A could use a DSP to route and mix the audio stream in order to allow each party in the conference to communicate with the other parties. At the time of system boot up or during the initialization of the real time protocol (RTP) module, the RTP local port information is set for the endpoints. This setting can be either dynamic or static. In the case of dynamic initialization of the RTP ports, the starting port number as well as the range of the port numbers are user configurable. For example, a starting port number may be 8000 and the range may be 200. This means that from port 8000 to port 8199 can be used by the RTP instances. The VoIP protocol stack supports multiple instances (channel) and multiple calls per instance. Thus for every instance and every call associated with that instance there would be a RTP port allocated statically or dynamically. In other words, we have a two dimensional array for RTP ports as RTPPort [instance] [call]. The keys (e.g., "*3", "*1", etc.) used below are only examples and could vary depending on implementation.

Figure 4:
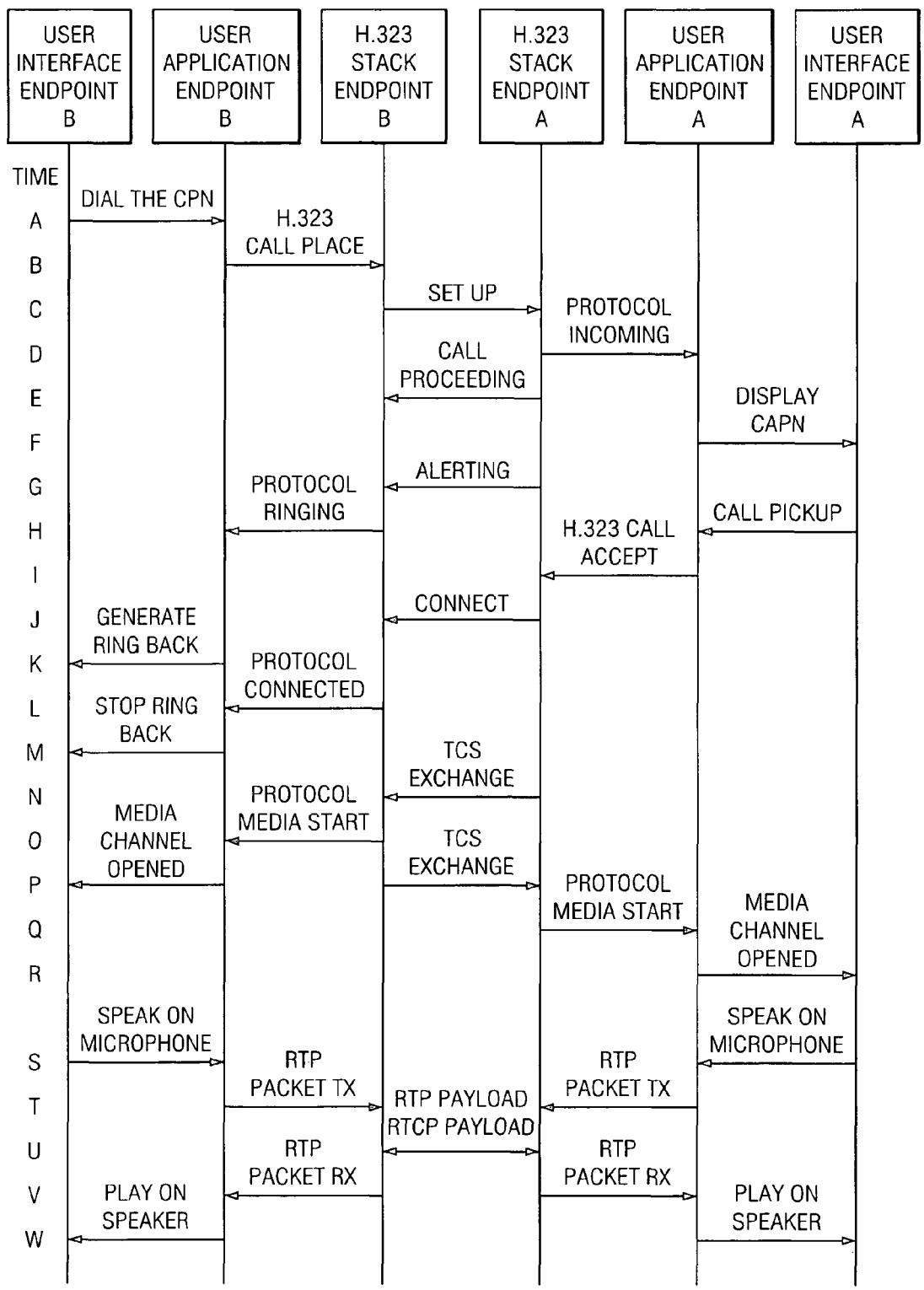
FIG. 4 illustrates a chart of exemplary signals for a call set up between an exemplary endpoint. A and an exemplary endpoint B in accordance with the principles of the present invention.

Now, Endpoint B (not shown in FIG. 3) makes a normal call to Endpoint A using the Internet Protocol (IP) address or the H.323/E164 Alias with which Endpoint A has registered to the gatekeeper. This signaling is illustrated in FIG. 4. Endpoint B initiates a call to Endpoint A by dialing the Called Party Number (CPN). When Endpoint B calls Endpoint A, Endpoint A accepts the call. At this point, H.225 signaling is done and both Endpoint A and Endpoint B exchange the H.245 Terminal Capabilities Set, Master Slave Determination Status Number and at the time of Opening the Logical Channel, RTPPort and RTCPort numbers are stated in it for RTP/RTCP communication. These RTP and RTCP ports are based on the instance number and the call number for that particular instance. Assuming that this call is the first call (of the conference) to Endpoint A, RTPPort [instance=1] [call=1] and RTCPPort [instance=1] [call=1] are passed as parameters in the Open Logical Channel H.245 signaling and a connection is established.

Figure 5:
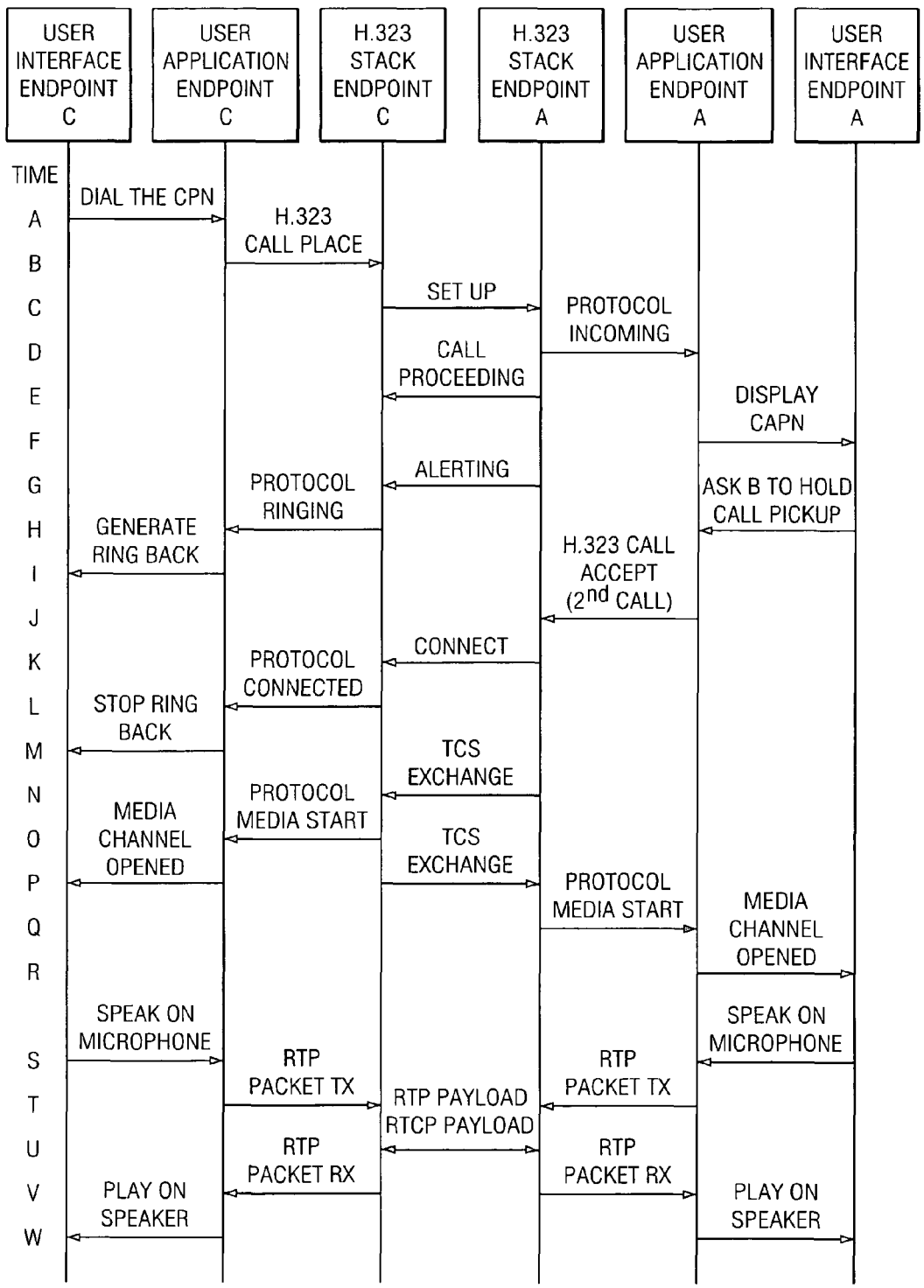
FIG. 5 illustrates a chart of exemplary signals for a call set up between an exemplary endpoint A and an exemplary endpoint C (asking exemplary endpoint B to hold) in accordance with the principles of the present invention.

Now assume that while Endpoint A is in conversation with Endpoint B, Endpoint C calls up Endpoint A. This signaling is illustrated in FIG. 5. When Endpoint C calls in, Endpoint A hears a beep sound on its handset and at this stage Endpoint A wishes to attend the new incoming call and perhaps also check with Endpoint C if it would like to get into a conference with Endpoint A and Endpoint B. Thus, Endpoint A verbally asks Endpoint B to hold on (No H.450.4 signaling is done). It is to be noted that the implementation of the present invention does not use H.450.4 signaling for call hold. In case this is used, the other endpoints are constrained to support the H.450.4 call hold supplementary service.

At this juncture, Endpoint A, in order to initiate the event to talk to Endpoint C, presses the keys "*1" and an appropriate function (e.g., H323 Call Accept) is called to start the H.225 signaling and the H.245 signaling. Also, the packets arriving at RTPPort [instance=1] [call=1] and RTCPPort [instance=1] [call=1] of Endpoint A are discarded and not played to the handset. But the RTP/RTCP ports are never closed. The "Silence Packet" is sent to Endpoint B so that Endpoint B does not feel that it has been disconnected from the call and time out waiting for the RTP packets. Both Endpoint A and Endpoint C exchange the H.245 Terminal Capabilities Set and Master Slave Determination Status Number, but at the time of Opening the Logical Channel, RTPPort [1] [2] and RTCPPort [1] [2] is stated in it as the call is for the first instance (Endpoint A) and it is a second call for that instance. Endpoint A and Endpoint C start talking to each other. At this juncture, there are three different cases to be handled.

Case 1. Endpoint C expresses its desire to get into the conference with Endpoint A and Endpoint B.

Case 2. Endpoint C expresses its desire to disconnect and Endpoint A continues its conversation with Endpoint B.

Case 3. Endpoint C expresses its desire to hold on until Endpoint A has finished its conversation with Endpoint B.

Figure 6:
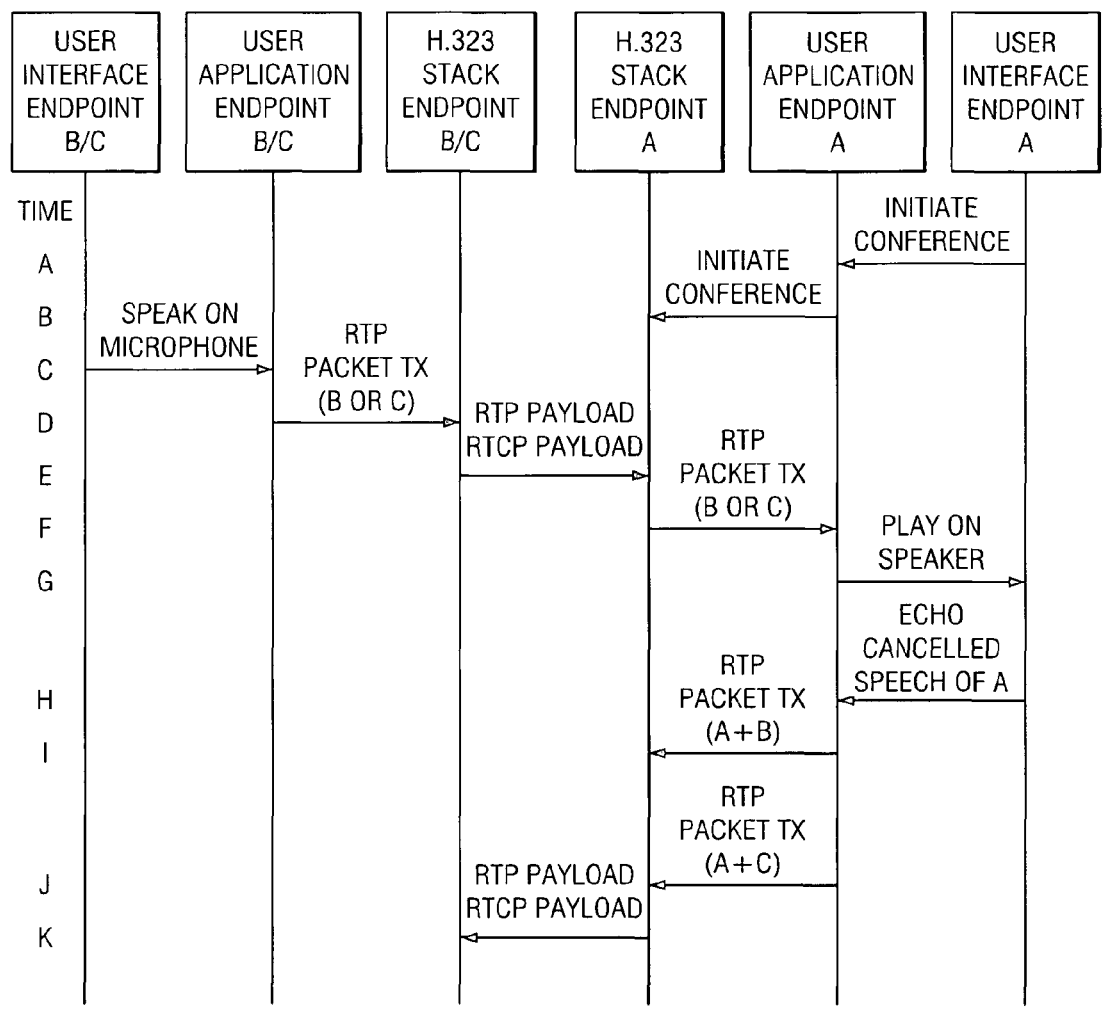
FIG. 6 illustrates a chart of exemplary signals for initiating an audio conference between exemplary endpoints A, B and C and handling real time protocol (RTP) packets during the conference in accordance with the principles of the present invention.

These three cases will now be discussed in more detail. First consider Case 1. Endpoint C desires to get into the conversation with Endpoint A and Endpoint B. This scenario is illustrated in FIG. 6. At this juncture Endpoint A presses the keys "*3" and the conference is initiated. First we stop discarding the RTP packets at RTPPort [instance=1] [call=1] and RTCPPort [instance=1] [call=1]. In this case, the RTP packets at Endpoint A from Endpoint B and Endpoint C, which are received separately, are mixed. This mixed output is played out at the speaker of Endpoint A. With each participant communicating with RTP, the RTP session can be uniquely identified by the network address together with a port pair for RTP and RTCP. The thirty two (32) bit numeric Synchronization SouRCe (SSRC) identifier in the RTP header also provides an identification of the source of stream of RTP packets. This is provided so as not to be dependent upon the network address identification. With identification of RTP packets, Endpoint A is able to distinguish RTP packets of Endpoint B and Endpoint C. Also, the echo cancelled speech of Endpoint A is mixed with received speech from Endpoint C and sent as RTP packets to Endpoint B. For Endpoint B, it is just the RTP packets from Endpoint A and it does not have any communication with Endpoint C. Similarly, the echo cancelled speech of Endpoint A is mixed with the received speech from Endpoint B and sent as RTP packets to Endpoint C. For Endpoint C, it is just the RTP packets sent by Endpoint A and it does not have any communication with Endpoint B.

RTCP Sender Reports (RTCP-SR) and RTCP RR Reports (RTCP-RR) are communicated only between Endpoints A and B and between Endpoints A and C. There is no delay of the RTCP SR and RR between Endpoint B and Endpoint C as for them there are no RTP packets received from (or sent to) each other. This reduces the traffic of RTCP reports being communicated during the conference. In the normal implementation of the centralized MCU to facilitate conferencing, there will be RTCP SR and RR reports being sent by all the endpoints in the conference to the MCU and MCU broadcasts the RTCP SR and RR to all other endpoints in the conference except for the one from whom it received the reports. Also the same applies for the RTP packets. RTP packets are sent by all the attendees of the conference to the MCU and MCU broadcasts the RTP packets to all other endpoints in the conference except for the one from whom it received the RTP packets. In the exemplary embodiment of the present invention, the traffic of RTP packets is also reduced which would help in saving the bandwidth and also improve on the delay and loss of RTP packets in bandwidth insufficient network situations.

In the case of a three party conference, there would be three SSRC for the three attendees of the conference. In the centralized MCU implementation, to facilitate conferencing, the Contributing SouRCe (CSRC) field present in the RTP packets would indicate the list of the SSRCs of the Endpoint whose speech is there as payload in the RTP packet. Thus for a particular RTP packet, if the payload is a mixed voice from two or more endpoints with $SSRC\_1, SSRC\_2, \ldots, SSRC\_n$, then the CSRC field should be set to the list of all the SSRCs whose voice is present as payload in the RTP packet. In the exemplary embodiment of the present invention, because Endpoint C is unaware of Endpoint B, Endpoint C never receives the CSRC field with SSRC_B and similarly, Endpoint B never receives the CSRC field with SSRC_C. Endpoint B receives the mixed voice of Endpoint A and Endpoint C with CSRC as zero ("0") and SSRC as SSRC_A. Similarly, Endpoint C receives the mixed voice of Endpoint A and Endpoint B with CSRC as zero ("0") and SSRC as SSRC_A. As is evident, this does not give rise to the interoperability issue when talking to an endpoint that assumes an MCU implementation for facilitating a conference call.

At the end of the conference or during the conference, the initiator of the conference can selectively reject the attendees in the conference. For example, in the above described scenario, Endpoint A is the initiator of the conference and Endpoint B and Endpoint C are the other two attendees of the conference. Then Endpoint A can selectively reject the call with Endpoint B or Endpoint C. If Endpoint A presses the keys "*4" followed by the VALID E.164 Alias of the attendees of the conference, then a particular function (e.g., H323CallHangE164 (E.164 Alias)), which implements the call terminate procedure according to the standard, is invoked to initiate the call hang-up procedure, for the particular instance and call associated with the specified E.164 Alias.

Now consider Case 2 in which Endpoint C disconnects and Endpoint A continues its conversation with Endpoint B. In this case, Endpoint A presses the keys "*2" and the stalling of the discard of the RTP packets at RTPPort [instance=1] [call=1] and RTCPPort [instance=1] [call=1] is initiated. The RTP packets from Endpoint B are played to the speaker of Endpoint A and also the sending of the "silence packets" from Endpoint A to Endpoint B is stopped and replaced by actual voice packets from Endpoint A. Also, the call between Endpoint A and Endpoint C is dropped and RTP ports associated with that particular call are also closed.

Now consider Case 3 in which Endpoint C holds on until Endpoint A has finished its conversation with Endpoint B. In this case, Endpoint A presses the keys "*1" and initiates the discarding of RTP packets coming from Endpoint C, sends the "silent packets" to Endpoint C so that Endpoint C does not feel that it has been disconnected from the call and time out waiting for the RTP packets and also stops discarding RTP packets coming from Endpoint B. The RTP packets received from Endpoint B are played to the speaker and the speech of Endpoint A is sent to the Endpoint B as RTP packets.

The call set up and termination procedure between the endpoints has now been described. Next the mixing and the echo canceller of the system will be described as used in a three party conference.

FIG. 3 illustrates an exemplary system 300 of the present invention comprising an Endpoint A (designated with reference numeral 315) that manages and participates in an audio conference. Endpoint A is coupled to network 310 (e.g., Internet 310). The packets received in Endpoint A from Endpoint B are designated with the letters "Rx0" and the packets transmitted to Endpoint B are designated with the letters "Tx0". Similarly, packets received and transmitted to Endpoint C are designated with the letters "Rx1" and "Tx1" respectively.

An audio mixer 320 appropriately mixes the decoded Rx0 and Rx1 stream and plays it out to speaker 330 of Endpoint A. The mixed stream of Rx0 and Rx1 in FIG. 3 is also given as the reference to the adaptive echo canceller 340. The microphone input from microphone 350 at Endpoint A consists of the acoustic echo plus the near end speech of Endpoint A. The function of echo canceller 340 is to cancel out the echo. An echo free near end speech, in an ideal case, will be present at the output of echo canceller 340. This speech is mixed with that received from Rx0, encoded, packetized and transmitted (Tx1) to Endpoint C. Similarly, the echo free near end speech is mixed with that received from Rx1, encoded, packetized and transmitted (Tx0) to Endpoint B. Transmission of packets to Endpoint B and Endpoint C uses a UniCast addressing scheme.

Figure 7:
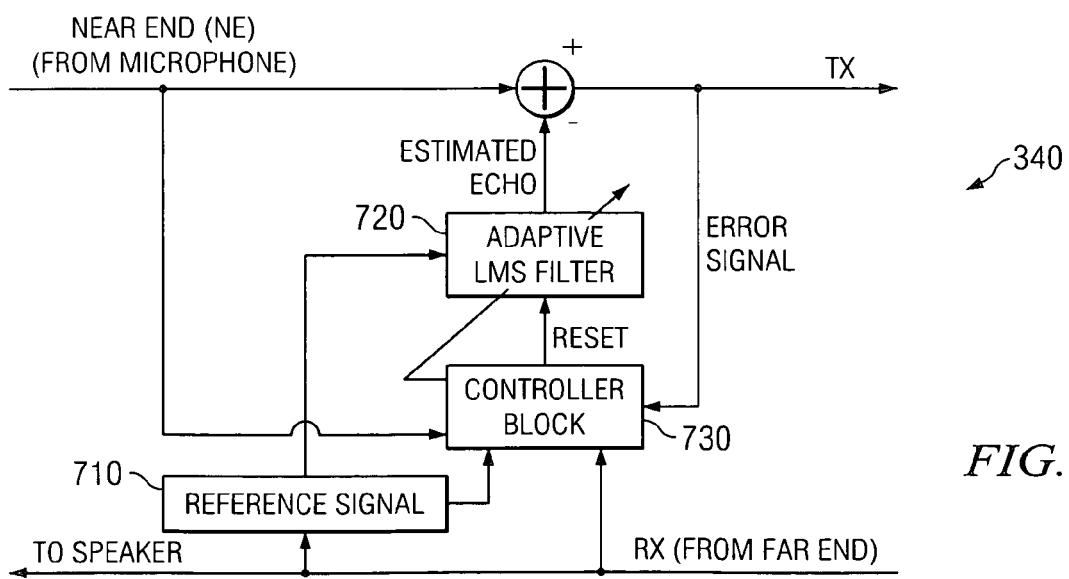
FIG. 7 illustrates an exemplary echo canceller in accordance with the principles of the present invention.

As shown in FIG. 7, echo canceller 340 comprises a reference signal unit 710, an adaptive least mean square (LMS) filter 720, and a controller block 730 constructed in accordance with the principles of the present invention. The general operation of echo cancellers is well known in the art. The uniqueness and novelty of echo canceller 340 inheres in the uniqueness and novelty of controller block 730.

FIG. 8 illustrates a flow chart showing exemplary steps in the operation of controller block 730 of the present invention. The steps illustrated in FIG. 8 are collectively referred to with reference numeral 800. Controller block 730 of echo canceller 340 performs power/energy calculations (step 810) and performs near end (NE) background noise estimation (step 820). Controller block 730 also performs far end (FE) silence detection (step 830), near end (NE) silence detection (step 840), and double talk detection (step 850). Specifically, controller block 730 determines if the far end (FE) is speaking or is silent, and determines if the near end (NE) is speaking or is silent, and determines if double talk (DT) session is detected.

Based on the results of the near end (NE) silence detection process and on the results of the double talk (DT) detection process, controller block 730 freezes the coefficients of the adaptive filter (step 870) when either near end (NE) silence is detection or a double talk (DT) session is detected. Controller block 730 also detects the divergence of the LMS filter (step 860). If the during adaptation process the LMS filter diverges, then a decision to reset the LMS filter coefficients is taken. Controller block also determines when to adjust the receive attenuation (step 880). These functions will now be described in more detail.

Figure 9:
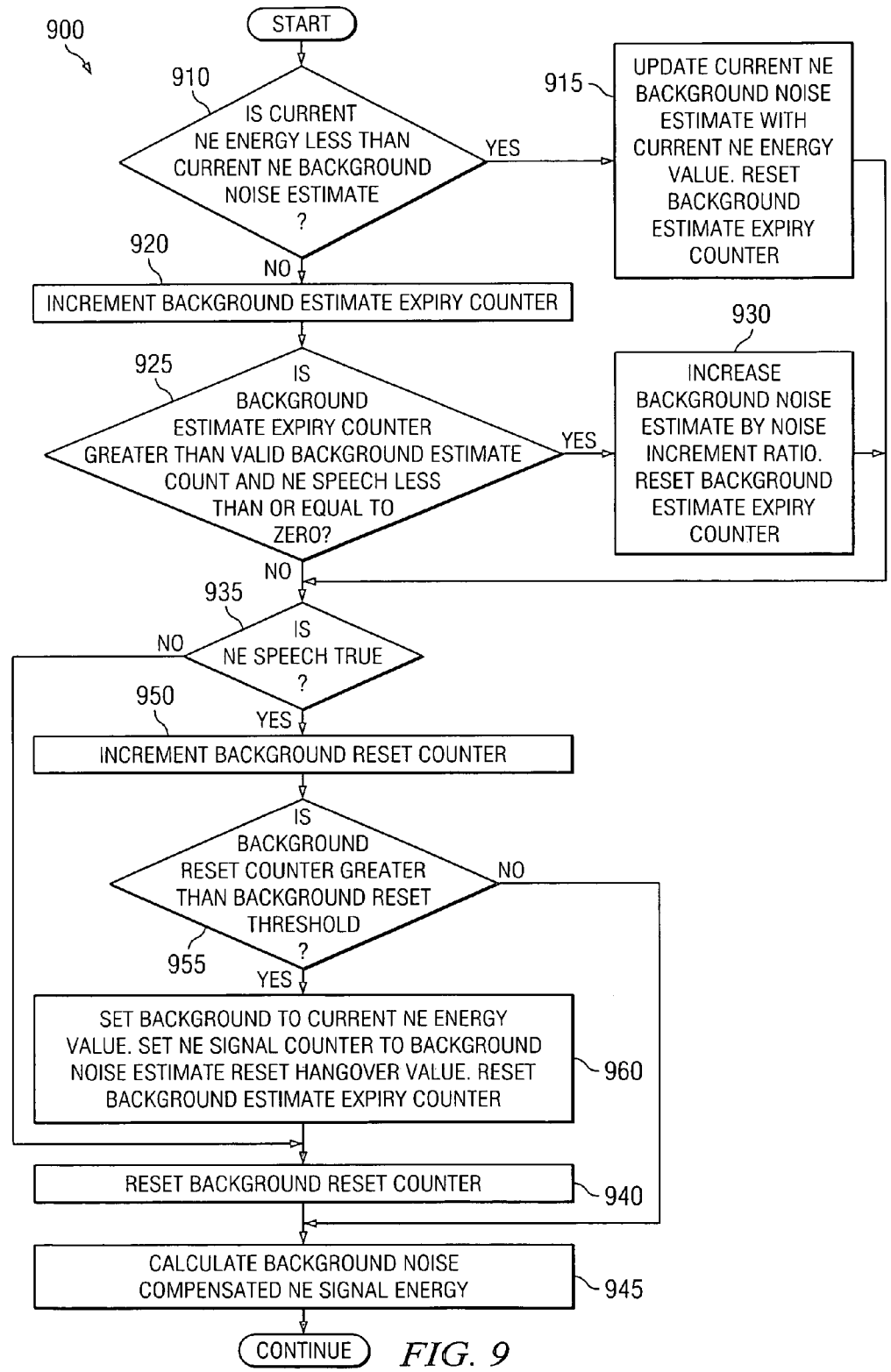
FIG. 9 illustrates a flow chart showing exemplary steps for the operation of a near end background noise estimation process in accordance with the principles of the present invention.

FIG. 9 shows the flow chart for the control of near end (NE) background noise estimation (BNE). The steps illustrated in FIG. 9 are collectively referred to with reference numeral 900. In FIG. 9 the energy calculation of the near end (NE) input signal is used to estimate the background noise energy. Two counters are used: (1) a background noise estimate expiry counter, and (2) a background reset counter. At the initialization stage, a high value for the background noise estimate (BNE) is set. Then this is progressively brought down and settles at the actual background noise energy value.

First a determination is made whether the current near end (NE) energy is less than the previous near end (NE) background (BG) estimate (decision step 910). If the current near end (NE) energy is less than the current near end (NE) background noise estimate, then the background (BG) noise estimate is updated with the current near end (NE) energy estimate and the background estimate expiry counter is reset (step 915). Control then passes to step 935.

If the current near end (NE) energy is not less than the current near end (NE) background noise estimate, then the background estimate expiry counter in incremented (step 920). Then a determination is made whether the incremented value of the background estimate expiry counter is greater than an upper threshold and the "near end (NE) speech" flag is not detected (i.e. less than or equal to zero) (decision step 925). If these conditions are met, then the background noise estimate is incremented by a certain adjustable/pre-determined amount (i.e., noise increment ratio) and the background estimate expiry counter is reset (step 930). This is to take care of conditions in which the background noise estimate gets locked at some very low value. Control then passes to step 935.

If the incremented value of the background estimate expiry counter is not greater than an upper threshold and the "near end (NE) speech" flag is not detected, then a determination is made whether the near end (NE) speech flag is detected (i.e., whether the near end (NE) speech flag is set to a logical value of "true") (decision step 935).

If the near end (NE) speech flag is detected, then the background reset counter is incremented (step 950). The incremented value of the background reset counter is then compared to a background reset count threshold value, which is typically significantly larger than the upper threshold value used in the comparison of the background noise estimation (BGE) expiry counter (step 955). When the incremented background reset counter is greater than the background reset threshold value, it means that the near end (NE) energy has consistently been much higher than the current background noise estimate. But the possibility of the "near end (NE) speech" flag being continuously set over a long time period is very small. This could only mean that the overall background noise has increased significantly. Therefore, in this case, the background noise estimate is updated with the latest near (NE) energy value (step 960). The near end (NE) signal counter is set to the background noise estimate reset hangover value (step 960). The background estimate expiry counter is reset (step 960). Then the background reset counter is reset (step 940).

The background noise (BGN) estimation can then restart the estimation process based on the latest near (NE) energy value. Now, because an estimate of the background noise (BGN) is available, the background noise compensated near end (NE) signal energy can be calculated (step 945).

If the background reset counter is not greater than the background reset threshold in decision step 955, then the background noise compensated near end, (NE) signal energy is calculated (step 945) immediately after step 955.

Lastly, if the near end (NE) speech flag is not detected in step 935 (i.e., the near end (NE) speech flag is set to a logical value of "false"), then the background reset counter is reset (step 940) and the background noise compensated near end (NE) signal energy is calculated (step 945) immediately after step 940.

FIG. 10 shows the flow chart for determining whether the far end (FE) is silent or whether the far end (FE) is speaking. The steps illustrated in FIG. 10 are collectively referred to with reference numeral 1000. First the far end (FE) energy is calculated from data received from the far end. (This step is not shown in FIG. 10). Then a determination is made whether the far end (FE) energy is greater than a pre-defined far end (FE) silence threshold (decision step 1010). If the far end (FE) energy is greater than the far end (FE) silence threshold, then the far end is not silent and what is being received is speech.

Control then passes to step 1015 where a "far silence" flag is set equal to a logical value of "false." This indicates that there is no silence at the far end. A counter called "far end (FE) speech counter" is then set to a predefined value called "far end speech hangover" (step 1015) and the process continues.

If the far end (FE) energy is not greater than the far end (FE) silence threshold in step 1010, then the far end is silent and what is being received is silence. Control then passes to step 1020 where the "far silence" flag is set equal to a logical value of "true."

Then a determination is made whether the value of the far end (FE) speech counter is greater than zero (step 1025). If the value of the far end (FE) speech counter is greater than zero, then the value of the far end (FE) speech counter is decremented (step 1030) and the process continues. If the value of the far end (FE) speech counter is not greater than zero (step 1025), then the value of the of the far end (FE) counter remains unchanged and the process continues.

The purpose of the far end (FE) speech counter is to avoid an immediate switch to a decision of "far end (FE) silence" that could occur during pauses in the far end (FE) speech or the duration between words.

Figure 11:
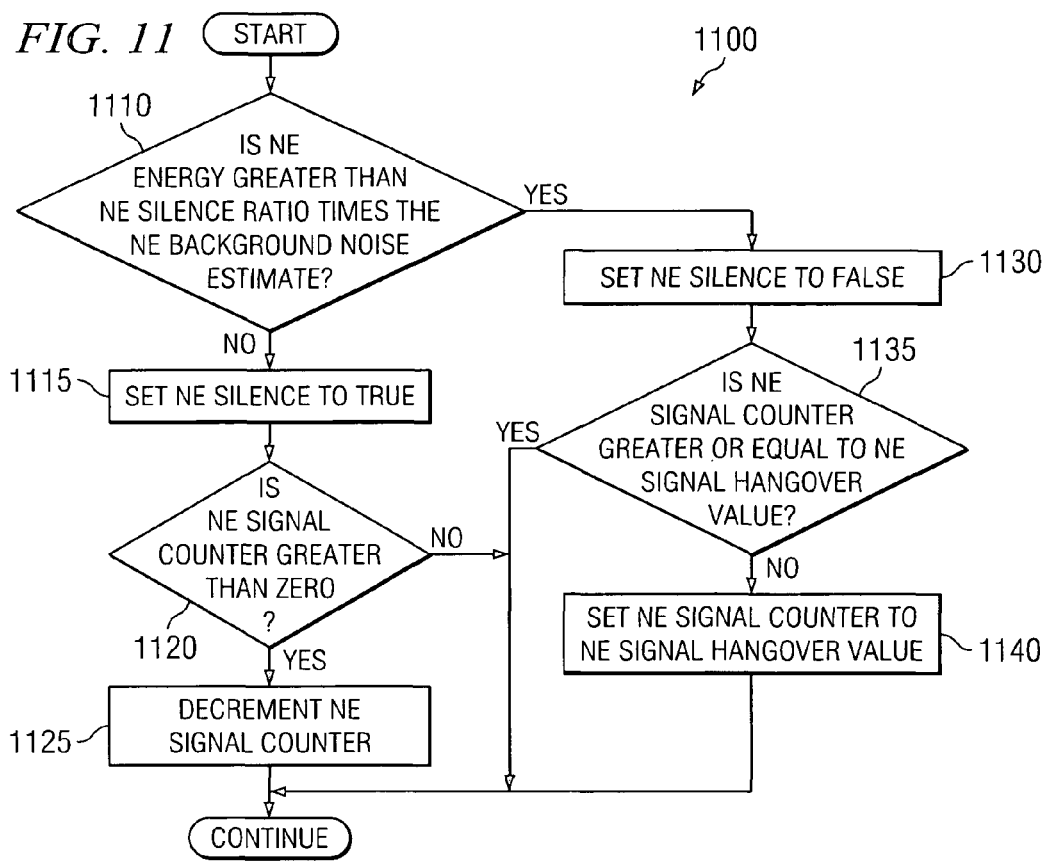
FIG. 11 illustrates a flow chart showing exemplary steps for the operation of a near end silence detection process in accordance with the principles of the present invention.

FIG. 11 shows the flow chart for determining whether the near end (NE) is silent or whether the near end (NE) is speaking. The steps illustrated in FIG. 11 are collectively referred to with reference numeral 1100. First the near end (NE) energy is calculated from data received at the near end. (This step is not shown in FIG. 11).

Then a determination is made whether the near end (NE) energy is greater than a near end (NE) silence ratio times the near end (NE) background noise estimate (decision step 1110). That is, a determination is made whether the near end (NE) energy is greater than the near end. (NE) background (BG) noise estimate by a predefined factor (i.e., a near end (NE) silence ratio) that is decided based on the echo feedback of the speaker and microphone set-up.

If the near end (NE) energy is greater than the threshold, then a "near end (NE) silence" flag is set equal to a logical value of "false" (step 1130). This indicates that the near end (NE) is not silent. If the near end (NE) energy is less than the threshold, then the "near end (NE) silence" flag is set equal to a logical value of "true" (step 1115). This indicates that the near end (NE) is silent.

After the near end (NE) silence flag is set to a logical value of "false" (step 1130), then a determination is made whether a "near end (NE) signal counter" is greater than or equal to a "near end (NE) signal hangover value" (step 1135).

If the value of the near end (NE) signal counter is greater or equal to the near end (NE) signal hangover value (the YES branch in decision step 1135), then the process continues. If the value of the near end (NE) signal counter is not greater or equal to the near end (NE) signal hangover value (the NO branch in decision step 1135), then the value of the near end (NE) signal counter is set equal to the value of the near end (NE) signal hangover value (step 1140) and the process continues.

If "near end (NE) silence" flag is set equal to a logical value of "true" (step 115), then a determination is made whether the near end (NE) signal counter is greater than zero (step 1120). If the near end (NE) signal counter is not greater than zero (the NO branch is decision step 1120), the process continues. If the near end (NE) signal counter is greater than zero (the YES branch in decision step 1120), the near end (NE) signal counter is decremented (step 1125), and the process continues.

Figure 12:
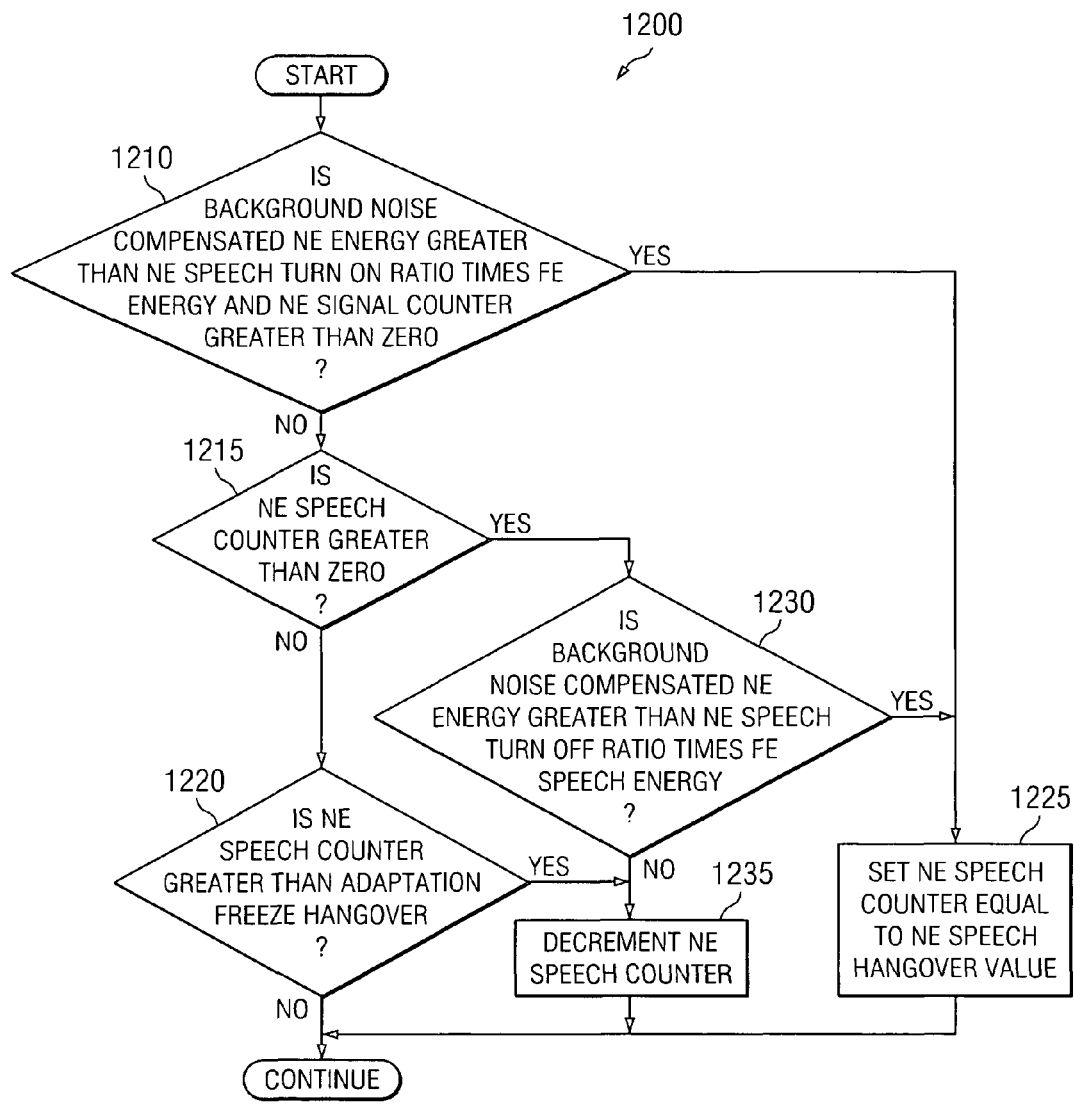
FIG. 12 illustrates a flow chart showing exemplary steps for the operation of a near end speech or double talk detection process in accordance with the principles of the present invention.

FIG. 12 shows the flow chart for the double talk (DT) detector. The steps illustrated in FIG. 12 are collectively referred to with reference numeral 1200. In FIG. 12 a determination is made whether the background noise compensated near end (NE) energy is greater than the far end (FE) energy times a ratio called the "near end (NE) speech turn on ratio" and also if the "near end (NE) signal counter" is greater than zero (step 1210). If the near end (NE) signal counter is greater than zero, it means that the near end (NE) silence flag has a logical value of "false" and that it is in the hangover period of near end (NE) silence detection.

If the background noise compensated near end (NE) energy is greater than the far end (FE) energy times the "near end (NE) speech turn on ratio" and if the "near end (NE) signal counter" is greater than zero (the YES branch of decision step 1210), then the near end (NE) speech counter (which is the double talk (DT) flag) is set to a positive value that indicates near end (NE) speech/double talk (DT) (step 1225), and the process continues.

If the determination in step 1210 is not true (the NO branch of decision step 1210, then a determination is made whether the near end (NE) speech counter (i.e., the double talk (DT) flag) had already been set to a positive value previously (decision step 1215). If the near end (NE) speech counter has already been set to a value greater than zero (the YES branch in decision step 1215), a determination is then made whether the background (BG) noise compensated near end (NE) energy is greater than the far end (FE) energy times another ratio called the "near end (NE) speech turn off ratio" (decision step 1230).

If the determination that is made in decision step 1230 is yes (the YES branch in decision step 1230), it means there is still near end (NE) speech/double talk (DT) in progress. Then the near end (NE) speech counter is set to its near end (NE) speech hangover value (step 1225), and the process continues.

If the determination that is made in decision step 1230 is no (the NO branch in decision step 1230), it means that the near end (NE) speech/double talk (DT) is over. The near end (NE) speech counter is then decremented (step 1235), and the process continues.

If the near end (NE) speech counter is not greater than zero in decision step 1215 (the NO branch in decision step 1215), a determination is then made whether the value of the near end (NE) speech counter is greater than a value called "adaptation freeze hangover" (step 1220). If the near end (NE) speech counter is not greater than the adaptation freeze hangover value (the NO branch is decision step 1220), the process continues. If the near end (NE) speech counter is greater than the adaptation freeze hangover value (the YES branch in decision step 1220), then the near end (NE) speech counter is decremented (step 1235), and the process continues.

Figure 13:
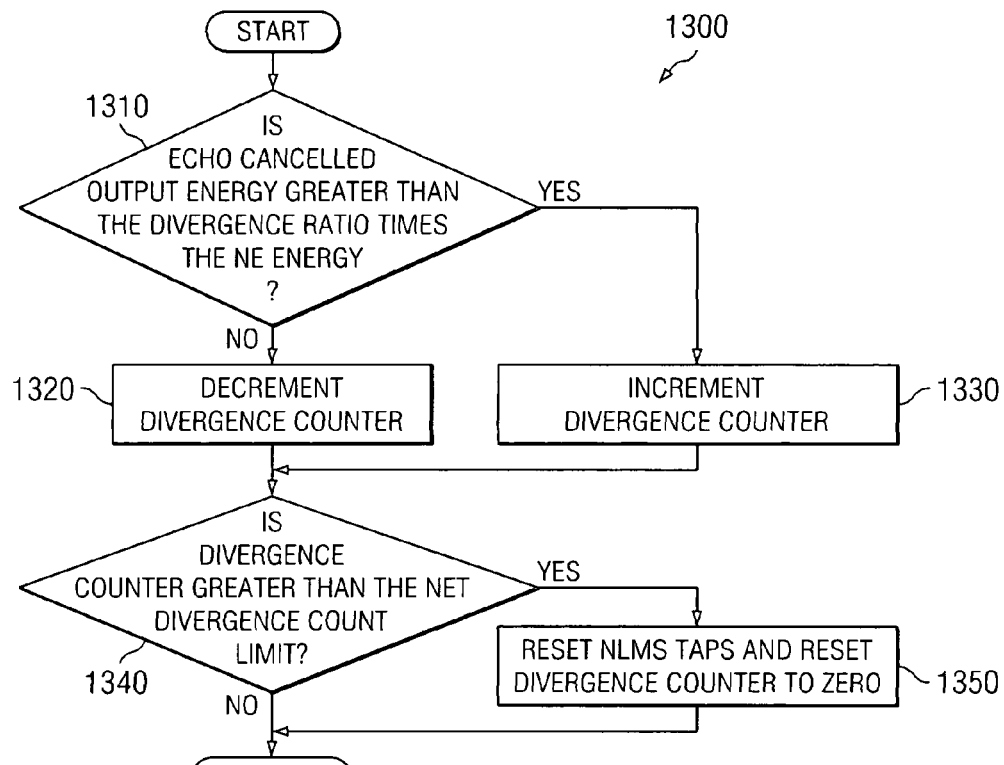
FIG. 13 illustrates a flow chart showing exemplary steps for the operation of a process for detecting the divergence of a least mean square (LMS) filter used for echo cancellation in accordance with the principles of the present invention.

FIG. 13 shows the flowchart for a divergence detection process for the LMS filter. The steps illustrated in FIG. 13 are collectively referred to with reference numeral 1300. In FIG. 13 the output of the LMS filter (i.e., the "Err signal" energy) is compared to the near end (NE) energy. A determination is made whether the echo cancelled output energy of the LMS filter is greater than a pre-defined divergence ratio times the near end (NE) energy (decision step 1310). If the echo cancelled output energy of the LMS filter is greater than the divergence ratio times the near end (NE) energy (the YES branch of decision step 1310), then a counter called the "divergence counter" is incremented (step 1330). Otherwise, the divergence counter is decremented (step 1320). Following the increment step (step 1330) or following the decrement step (step 1320), a determination is made whether the value of the divergence counter is greater than a predefined limit called a "net divergence count limit" (decision step 1340). If the value of the divergence counter is not greater than the net divergence count limit (the NO branch of decision step 1340), the process continues. If the value of the divergence counter is greater than the net divergence count limit (the YES branch of decision step 1340), the NLMS filter coefficient taps of the LMS filter are reset and the divergence counter is reset to a value of zero (step 1350).

Figure 14:
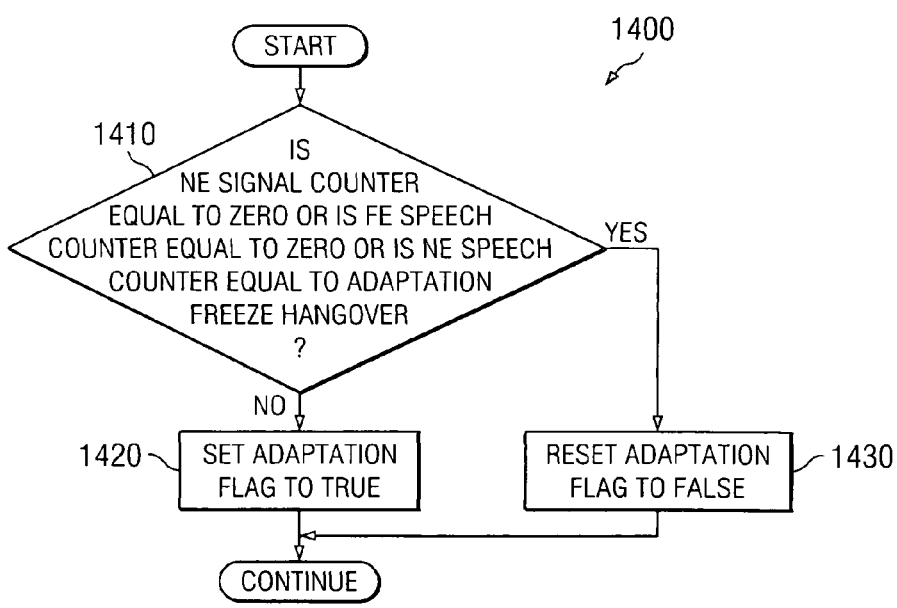
FIG. 14 illustrates a flow chart showing exemplary steps for the operation of a process for making a decision for freezing an adaptation of the LMS filter coefficients in accordance with the principles of the present invention.

FIG. 14 shows the flowchart for making a decision to control the adaptation of the LMS filter coefficients. The steps illustrated in FIG. 14 are collectively referred to with reference numeral 1400. A determination is made using the counters that have been previously defined. The following determinations are made in decision step 1410. Whether the "near end (NE) signal counter" is equal to zero (which means that near end (NE) silence is detected), OR whether the "far end (FE) speech counter" is equal to zero (which means that the far end (FE) is silent), OR whether the "near end (NE) speech counter is still in a hangover period of freezing the adaptation. If all three conditions are met in decision step 1410 (the YES branch of decision step 1410), then an adaptation flag is reset to a logical value of "false" (step 1430). That is, adaptation is frozen. Otherwise, the adaptation flag is set to a logical value of "true" (step 1420). That is, adaptation is carried out only during the period of time when the far end (FE) speech (i.e., the echo) is fed back to the near end (NE).

Figure 15:
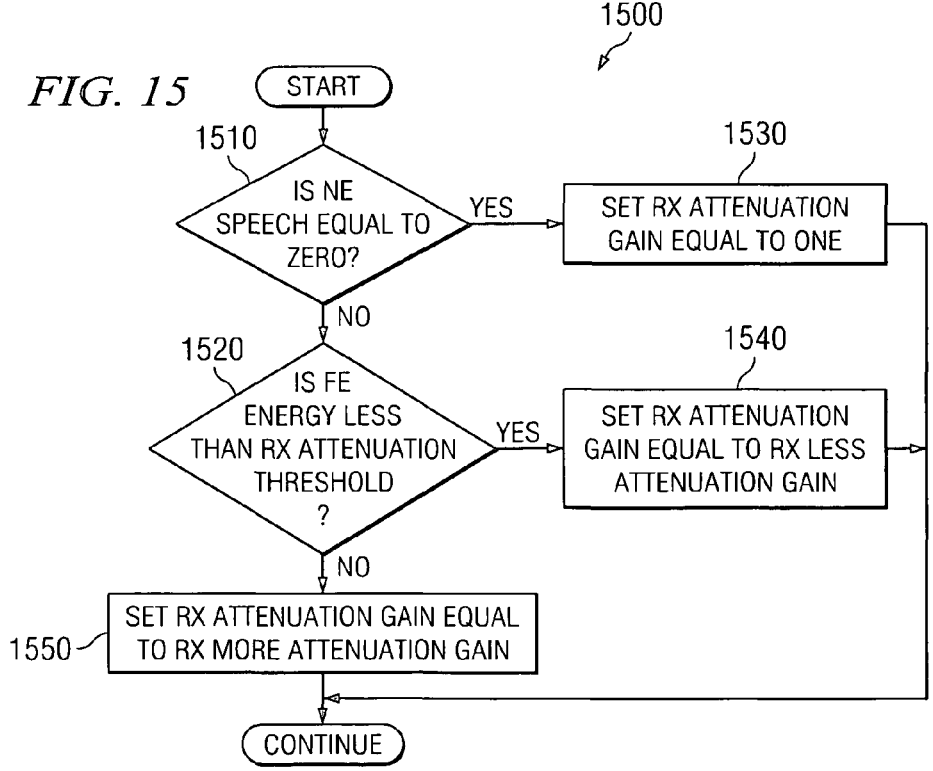
FIG. 15 illustrates a flow chart showing exemplary steps for the operation of a process for making a decision for attenuating receiver (Rx) gain in accordance with the principles of the present invention.

FIG. 15 shows a flow chart for making a decision to attenuating the receive gain by a factor during a double talk (DT) period. The steps illustrated in FIG. 15 are collectively referred to with reference numeral 1500. A determination is made whether near end (NE) speech is equal to zero (decision step 1510). If near end (NE) speech is equal to zero (i.e., near end (NE) speech is not present)(the YES branch of decision step 1510), then the receive attenuation gain is set equal to one (i.e., not attenuated) (step 1530), and the process continues.

If near end (NE) speech is not equal to zero (i.e., near end (NE) speech is present) (the NO branch of decision step 1510), then the far end (FE) energy value is checked (decision step 1520). A determination is made whether the far end (FE) energy is less than a receive attenuation threshold (decision step 1520). If the far end (FE) energy is less than the attenuation threshold (the YES branch of decision step 1520), the gain is attenuated by a predetermined amount (step 1540), and the process continues. If the far end (FE) energy is not less than the attenuation threshold (the NO branch of decision step 1520), a greater attenuation amount is used (step 1550), and the process continues.

Although the present invention has been described in detail, those skilled in the art will understand that various changes, substitutions, and alterations herein may be made without departing from the spirit and scope of the invention it its broadest form.

What is claimed is:

1. An apparatus for enabling a first endpoint in a packet network that comprises a plurality of endpoints to participate in and manage a multipoint audio conference in said packet network, said apparatus comprising:
a multipoint control unit located within said first endpoint that is configured to:
establish audio communication connections between said first endpoint and each of a plurality of other endpoints that participate in said multipoint audio conference;
mix audio communications from said first endpoint and from said plurality of other endpoints;
provide echo cancellation for audio communications from said first endpoint; and freezing coefficients of an adapter filter when a controller block of an echo canceller of said multipoint detects a silence condition.

2. The apparatus as set forth in claim 1 wherein said multipoint control unit is configured to mix an echo cancelled audio communication from said first endpoint with an audio communication received from a second endpoint and send a resulting mixed audio communication to at least one other endpoint.

3. The apparatus as set forth in claim 1 wherein said audio communications comprise real time protocol packets.

4. The apparatus as set forth in claim 1 wherein said controller block that is configured to control the operation of said adaptive filter in response to determinations made by said controller block based on characteristics of said audio communications.

5. The apparatus as set forth in claim 4 wherein said controller block is configured to:
perform an energy calculation of a near end (NE) signal; and
use said energy calculation of said near end (NE) signal to estimate a near end (NE) background noise energy value.

6. The apparatus as set forth in claim 4 wherein said controller block is configured to:
determine whether a near end (NE) signal represents silence; and
determine whether a near end (NE) signal represents speech.

7. The apparatus as set forth in claim 4 wherein said controller block is configured to:
determine whether a far end (FE) signal represents silence; and
determine whether a far end (FE) signal represents speech.

8. The apparatus as set forth in claim 4 wherein said controller block is configured to:
detect when a double talk (DT) session occurs.

9. The apparatus as set forth in claim 8 wherein said controller block is configured to:
freeze coefficients of said adaptive filter when a said controller block detects the occurrence of a double talk (DT) session.

10. The apparatus as set forth in claim 4 wherein said controller block is configured to:
detect a divergence of said adaptive filter; and
in response to said detection, reset coefficients of said adaptive filter.

11. The apparatus as set forth in claim 8 wherein said controller block is configured to:

adjust receive attenuation gain during the occurrence of a double talk (DT) session.

12. A method for enabling a first endpoint in a packet network that comprises a plurality of endpoints to participate in and manage a multipoint audio conference in said packet network, said method comprising:

locating a multipoint control unit within said first endpoint;

operating said multipoint control unit to establish audio communication connections between said first endpoint and each of a plurality of other endpoints that participate in said multipoint audio conference;

operating said multipoint control unit to mix audio communications from said first endpoint and from said plurality of other endpoints;

operating said multipoint control unit to provide echo cancellation for audio communications from said first endpoint; and operating said multipoint control unit to freeze coefficients of an adapter filter when a controller block of an echo canceller of said multipoint detects a silence condition.

13. The method as set forth in claim 12 further comprising:

operating said multipoint control unit to mix an echo cancelled audio communication from said first endpoint with an audio communication from a second endpoint; and sending a resulting mixed audio communication to at least one other endpoint.

14. The method as set forth in claim 12 wherein said audio communications comprise real time protocol packets.

15. The method as set forth in claim 12 further comprising:

controlling an operation said adaptive filter with said controller block in response to determinations made by said controller block based on characteristics of said audio communications.

16. The method as set forth in claim 15 further comprising:

performing in said controller block an energy calculation of a near end (NE) signal; and using said energy calculation to said near end (NE) signal to estimate a near end (NE) background noise energy value.

17. The method as set forth in claim 15 further comprising:

determining whether a near end (NE) signal represents one of: silence and speech; and determining whether a far end (FE) signal represents one of: silence and speech.

18. The method as set forth in claim 15 further comprising:

detecting when a double talk (DT) session occurs.

19. The method as set forth in claim 18 further comprising:

freezing coefficients of said adaptive filter when a said controller block detects the occurrence of a double talk (DT) session.

20. The method as set forth in claim 15 further comprising:

detecting a divergence of said adaptive filter; and in response to said detection, resetting coefficients of said adaptive filter.

21. The method as set forth in claim 17 further comprising:

adjusting receive attenuation gain during the occurrence of a double talk (DT) session.

* * * * *